United States Patent [19]

Kageyama

[11] 4,417,641
[45] Nov. 29, 1983

[54] SYSTEM FOR CONTROLLING TWO-WHEEL AND FOUR-WHEEL DRIVES

[75] Inventor: Hayashi Kageyama, Ohta, Japan

[73] Assignee: Fuji Jukogyo Kabushiki Kaisha, Tokyo, Japan

[21] Appl. No.: 276,326

[22] Filed: Jun. 22, 1981

[30] Foreign Application Priority Data

Jun. 27, 1980 [JP] Japan ................................ 55-88331

[51] Int. Cl.³ .......................................... B60K 17/34
[52] U.S. Cl. .................................... 180/247; 180/233
[58] Field of Search ............... 180/247, 249, 233, 197, 180/24.1

[56] References Cited

U.S. PATENT DOCUMENTS 3,763,947 10/1973 Longshore .................. 180/247
4,298,085 11/1981 Moroto .................... 180/247

FOREIGN PATENT DOCUMENTS 2212328 3/1972 Fed. Rep. of Germany ...... 180/197
53-111937 9/1978 Japan ....................... 180/197
55-152624 11/1980 Japan ....................... 180/247

Primary Examiner—John A. Pekar
Attorney, Agent, or Firm—Martin A. Farber

[57] ABSTRACT

A system is for a four-wheel drive vehicle for automatically changing the transmission of the engine of the vehicle from two-wheel drive to four-wheel drive or vice versa in accordance with the driving condition. The transmission transmits power from the engine to two main wheels, and an electromagnetic clutch having a magnetizing coil transmits the power of the engine to drive two auxiliary wheels. A steering angle sensor produces an output signal when the steering angle exceeds a predetermined value, and a control circuit controls the clutch current applied to the coil of the electromagnetic clutch. The control circuit operates such that when the output signal of the steering angle sensor is applied thereto, the clutch current is cut off so as to disengage the electromagnetic clutch so as to provide two-wheel driving.

13 Claims, 2 Drawing Figures

SYSTEM FOR CONTROLLING TWO-WHEEL AND FOUR-WHEEL DRIVES

BACKGROUND OF THE INVENTION

The present invention relates to a system for a four-wheel drive vehicle for automatically changing the transmission from the two-wheel drive condition to the four-wheel drive condition or vice versa in accordance with the driving conditions. The present invention relates more particularly to a changing apparatus for the transmission having two-wheel drive and four-wheel drive transmitting devices, which employs an electromagnetic clutch in order to improve driving during a sharp turn.

In conventional four-wheel drive vehicles, a transmission device is adapted to drive either two wheels or four wheels by means of a dog clutch which is manually operated by a select lever.

Generally when a vehicle makes a turn, the rotating speeds of the front wheels and the rear wheels are different because of the difference between the turning radii of the front wheels and the rear wheels. However, usually a central differential gear for absorbing the difference is omitted to simplify construction. Accordingly, when a vehicle turns at a small radius, the rear wheels act to drive the vehicle at a speed higher than the speed driven by the front wheels because the rear wheels travel on a circle of a radius smaller than that of the front wheels. This will cause a so-called tight-corner or tight-turn braking phenomenon whereby the vehicle cannot be smoothly driven during a sharp turn.

It is an object of the present invention to provide an apparatus for controlling two-wheel and four-wheel drives during sharp turning which does not have the above disadvantages.

SUMMARY OF THE INVENTION

Therefore, the present invention provides an apparatus for controlling two-wheel and four-wheel drives which comprises an electromagnetic clutch enabling a change of the engaging state of a transmission with either of two wheels or four wheels by means of a signal, a steering angle sensor, and a control circuit. The control circuit cuts off the clutch current to the electromagnetic clutch changing to the two wheel drive when an output signal is applied thereto during driving at a sharp turn so that the tight-corner braking phenomenon is prevented.

The present invention will be explained more in detail with reference to the accompanying drawings.

DESCRIPTION OF PREFERRED EMBODIMENT

Figure 1:
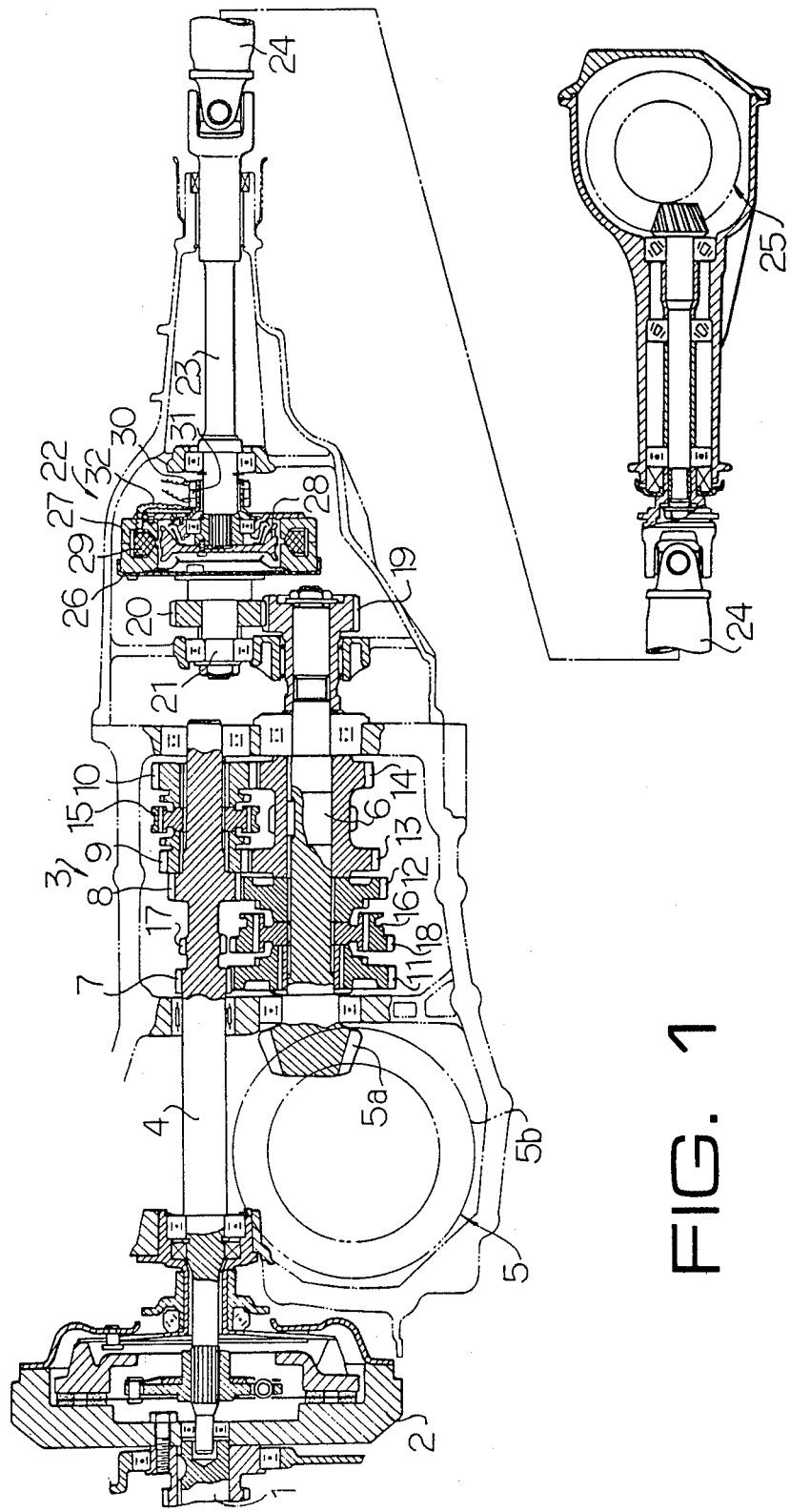
FIG. 1 is a cross-sectional view showing an embodiment of an apparatus in accordance with the present invention.

In FIG. 1, numeral 1 designates a crankshaft of an internal combustion engine mounted on a car (not shown). The crankshaft 1 is connected with an input shaft 4 of a transmission 3 through a well known mechanical clutch 2, which in turn is connected with a front differential device 5 disposed between the transmission 3 and the clutch 2. The transmission 3 has an output shaft 6 disposed parallel to the input shaft 4. The input shaft 4 is formed integrally with a 1st-speed gear 7 and a 2nd-speed gear 8 and has a 3rd-speed gear 9 and a 4th-speed gear 10 rotatably mounted thereon. The output shaft 6 has gears 11 and 12 engaged with gears 7 and 8 respectively, gears 13 and 14 engaged with gears 9 and 10 respectively, and a synchromesh mechanism 15 arranged between the gears 9 and 10 and a synchromesh mechanism 16 between the gears 11 and 12. The synchromesh mechanism 16 is operated to engage the gear 11 with the output shaft 6 by a shift lever (not shown), and thus the power from the input shaft 4 is transmitted to the output shaft 6 by means of the 11 at the 4th-speed transmission. Similarly three other steps of forward drive transmissions are achieved. Rearward drive transmission is achieved by engagement of a gear 17 provided on the shaft 4 with a gear 18 formed on the sleeve side of the synchromesh mechanism 16 through an idling gear (not shown). A drive pinion 5a for the front differential device 5 is formed integrally on the front end of the output shaft 6 and is engaged with a ring gear 5b.

The rear end of the output shaft 6 is connected to a shaft 21 disposed in alignment with the input shaft 4 by means of a pair of gears 19, 20 which are engaged with each other. This shaft 21 is to be connected to a rear differential device 25 through an electromagnetic clutch 22a, shaft 23 and a propeller shaft 24 and so on. The electromagnetic clutch comprises a drive member 27 secured to the shaft 21 by means of a drive plate 26, a driven member 28 secured mounted on the shaft 23, a magnetizing coil 29 provided in the drive member 27, clutch brushes 30, slip rings 31 and lines 32 connected to the magnetizing coil 29 to generate magnetic flux. The electromagnetic clutch 22 is engaged by magnetic powder aggregated in a small gap between the drive member 27 and the driven member 28 by the magnetic flux.

As clutch current supplied to the magnetizing coil 29 increases gradually, the clutch torque of the clutch increases.

Figure 2:
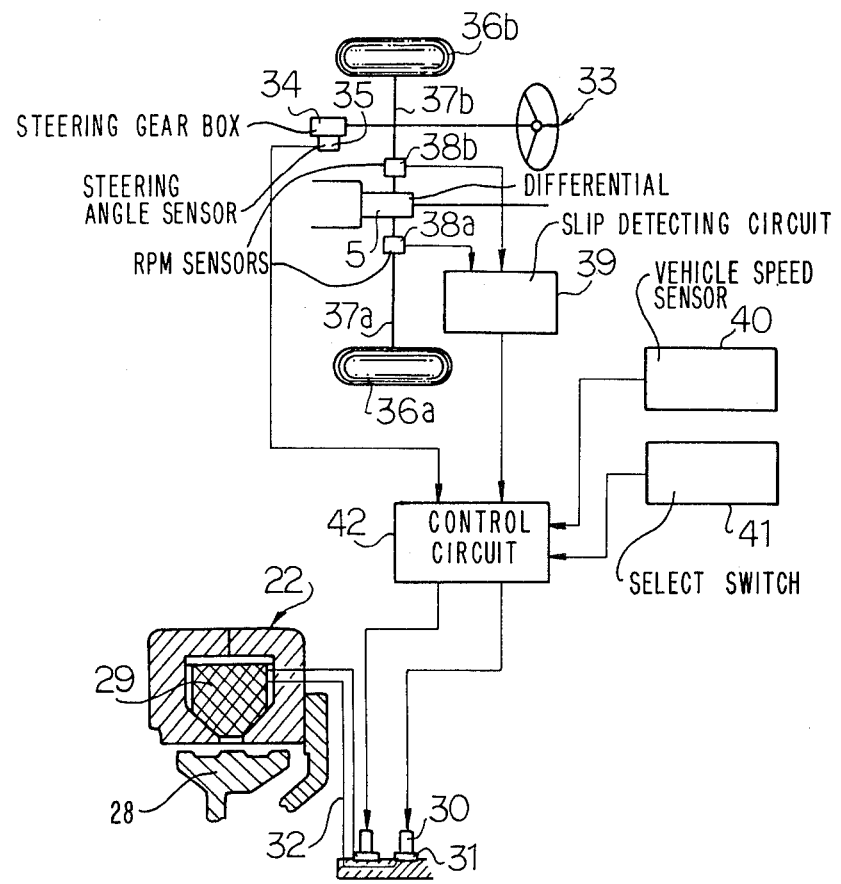
FIG. 2 is a block diagram of a control circuit for the apparatus.

An embodiment of the electromagnetic clutch control system according to the present invention will be explained hereinafter with reference to FIG. 2. A steering angle sensor 35 is provided on a steering gear box 34 of a steering device 33 to detect the steering angle. The steering angle sensor 35 is so arranged that when the steering angle exceeds a predetermined angle, an output signal is generated and which increases with an increase of the angle. A pair of rotation speed sensors 38a, 38b are provided respectively on wheel shafts 37a and 37b which are connected with respective front wheels 36a and 36b as main wheels for driving the vehicle. A slip detecting circuit 39 comprising a comparator is applied with output signals from these rotation speed sensors 38a and 38b and adapted to detect the occurrence of slippage by the difference between these output signals. A vehicle speed sensor 40 and a manually operated select switch 41 for selecting the two-wheel or four-wheel drives are also provided. The sensors 35, 40, the slip detecting circuit 39 and the select switch 41 are connected to a control circuit 42 for controlling the clutch current passing through the magnetizing coil 29. The control circuit 42 comprises gate circuits and a current control circuit. The control circuit is designated such that when the select switch 41 is operated to select the two-wheel drive, the clutch current is cut off, and when the four-wheel drive is selected, the clutch current is applied to the magnetizing coil 29 in such a manner as to increase stepwise to mitigate the shock caused by changing of the transmission.

When an output signal of the vehicle speed sensor 40 and the signal of the four-wheel drive from the select switch 41 are applied to the control circuit 42 and further the signal from the steering angle sensor 35 is applied thereto during the turning of the vehicle, the clutch current decreased with an increase of the steering angle and cuts off at a predetermined steering angle. Further, the control circuit 42 is adapted to apply the clutch current to the magnetizing coil 29 for engaging the clutch 22, when slipping of one of front wheels 36a, 36b is detected by the output of the slip detecting circuit 39.

In operation, when the select switch 41 is operated for two-wheel driving to cut off the clutch current, the electromagnetic clutch 22 is disengaged. Thus, the transmission of power of the engine to the rear wheels is cut off, so that the vehicle is driven by the front wheels. If, in the two-wheel driving condition, one of the front wheels slips, the control circuit 42 is actuated by the signal from the slip detecting circuit 39 to increase the clutch current rapidly to engage the electromagnetic clutch 22. Thus, the power of the transmission 3 is transmitted also to the rear wheels through the propeller shaft 24 and the rear differential device 25, achieving four-wheel drive to thereby recover the steady driving condition. When the vehicle is relieved from slipping, the slip detecting circuit 39 sends no more signals and the transmission turns back to the two-wheel drive condition. If the select switch 41 is turned to the four-wheel drive position, the electromagnetic clutch 22 is engaged, resulting in the four-wheel drive. When the vehicle turns a sharp corner, the steering angle sensor 35 produces an output signal for controlling the clutch current. Thus, the clutch current decreases as the steering angle increases. Thus, less power is transmitted to the rear wheels to thereby drive them at lower speed. Thus, the vehicle can be smoothly driven at a sharp turn. After turning, no longer is a signal sent from the steering angle sensor 35, so that the clutch current flows through the magnetizing coil 29 to engage the electromagnetic clutch 22 again. Thus, the power from the transmission 3 is transmitted to the rear wheels to achieve the four-wheel drive.

Since driving with two wheels or four wheels is automatically selected in accordance with the driving condition, sensitive operability is obtainable. During turning of the vehicle when it is being driven by four wheels, a part or all of the driving power to the rear wheels is cut off by the electro-magnetic clutch. That is to say, the driving power escapes through the electromagnetic clutch 22, that causes the speed difference between the front wheels and rear wheels to prevent the tight-corner braking phenomenon and other damages accompanied therewith. Although the illustrated system is provided with the vehicle speed sensor 40, it will be understood that the sensor is not always necessary.

What is claimed is:

1. A system for controlling driving with two wheels or four wheels, respectively in a vehicle powered by an internal combustion engine comprising transmission means for transmitting power from said engine to two main wheels of said vehicle, an electromagnetic clutch means having a magnetizing coil for selectively transmitting said power to two auxiliary wheels of the vehicle, a select switch means for energizing said magnetizing coil with clutch current for engaging said electromagnetic clutch means, means for detecting steering angle for producing an output signal when the steering angle exceeds a predetermined value, and control circuit means for cutting off said clutch current when said output signal of said steering angle detecting means is applied thereto, so as to disengage said electromagnetic clutch means.

2. The system according to claim 1 further comprising a slip detecting circuit means for detecting slipping of one of said two main wheels and for producing an output signal when slipping occurs, and said control circuit means for supplying the clutch current to said electromagnetic clutch means in dependency on said output signal of said slip detecting circuit means.

3. The system according to claim 1, wherein said select switch means is a manually operated switch.

4. The system according to claim 1, wherein said select switch means is for supplying the clutch current to said electromagnetic clutch means stepwise when driving with four wheels is selected.

5. The system according to claim 1, wherein said control circuit means for reapplying the clutch current to said electromagnetic clutch means stepwise so as to reengage said electromagnetic clutch means when said steering angle falls back to said predetermined value.

6. The system according to claim 1, further comprising a vehicle speed sensor means for detecting vehicle speed, said control circuit means via said steering angle detecting means for decreasing the clutch current to said electromagnetic clutch means dependent on the steering angle when said vehicle speed sensor means detects vehicle speed and said select switch means is in a condition for energizing said magnetizing coil with the clutch current for engaging said electromagnetic clutch means so as to drive with the power transmission to the four wheels.

7. A system for controlling driving with two wheels or four wheels, respectively in a vehicle powered by an internal combustion engine comprising transmission means for transmitting power from said engine to two main wheels of said vehicle, an electromagnetic clutch means having a magnetizing coil for selectively transmitting said power to two auxiliary wheels of the vehicle, a select switch means for energizing said magnetizing coil with clutch current for engaging said electromagnetic clutch means, means for detecting steering angle for producing an output signal with a level which increases with an increase of the steering angle, and control circuit means for controlling the clutch current applied to said magnetizing coil of said electromagnetic clutch means by decreasing said clutch current with an increase in the level of said output signal when said output signal of said steering angle detecting means is applied to said control circuit means when driving with the power transmission to the four wheels.

8. The system according to claim 7 further wherein said control circuit means for cutting off the clutch current so as to disengage said electromagnetic clutch means when said output signal level of said steering angle detecting means exceeds a predetermined value.

9. The system according to claim 8, wherein
said control circuit means for reapplying the clutch current to said electromagnetic clutch means stepwise so as to reengage said electromagnetic clutch means when said output signal level of said steering angle detecting means falls back to said predetermined value.

10. The system according to claim 7 further comprising
a slip detecting circuit means for detecting slipping of one of said two main wheels and for producing an output signal when slipping occurs, and
said control circuit means for supplying the clutch current to said electromagnetic clutch means in dependency on said output signal of said slip detecting circuit means.

11. The system according to claim 7, wherein
said select switch means is a manually operated switch.

12. The system according to claim 11, wherein
said select switch means is for supplying the clutch current to said electromagnetic clutch means stepwise when driving with four-wheels is selected.

13. The system according to claim 7, further comprising
a vehicle speed sensor means for detecting vehicle speed,
said control circuit means via said steering angle detecting means for decreasing the clutch current to said electromagnetic clutch means dependent on the steering angle when said vehicle speed sensor means detects vehicle speed and said select switch means is in a condition for energizing said magnetizing coil with the clutch current for engaging said electromagnetic clutch means so as to drive with the power transmission to the four wheels.

* * * * *